Sept. 21, 1926.  A. E. PAIGE  1,600,904
CENTRIFUGAL CASTING MECHANISM
Filed Oct. 17, 1925  4 Sheets-Sheet 2
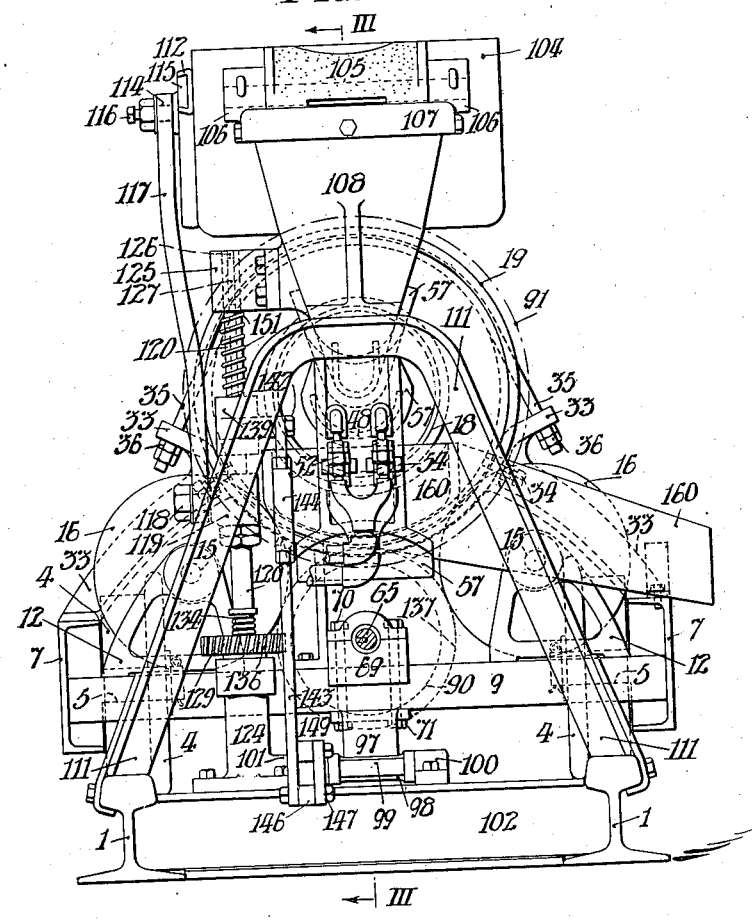
FIG. II.
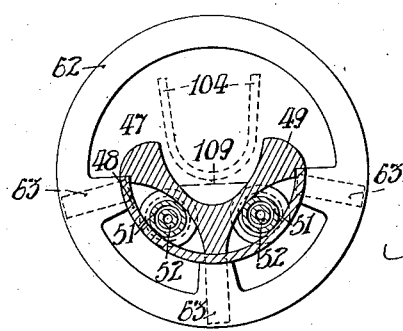
FIG. VI.
INVENTOR:
Arthur E. Paige

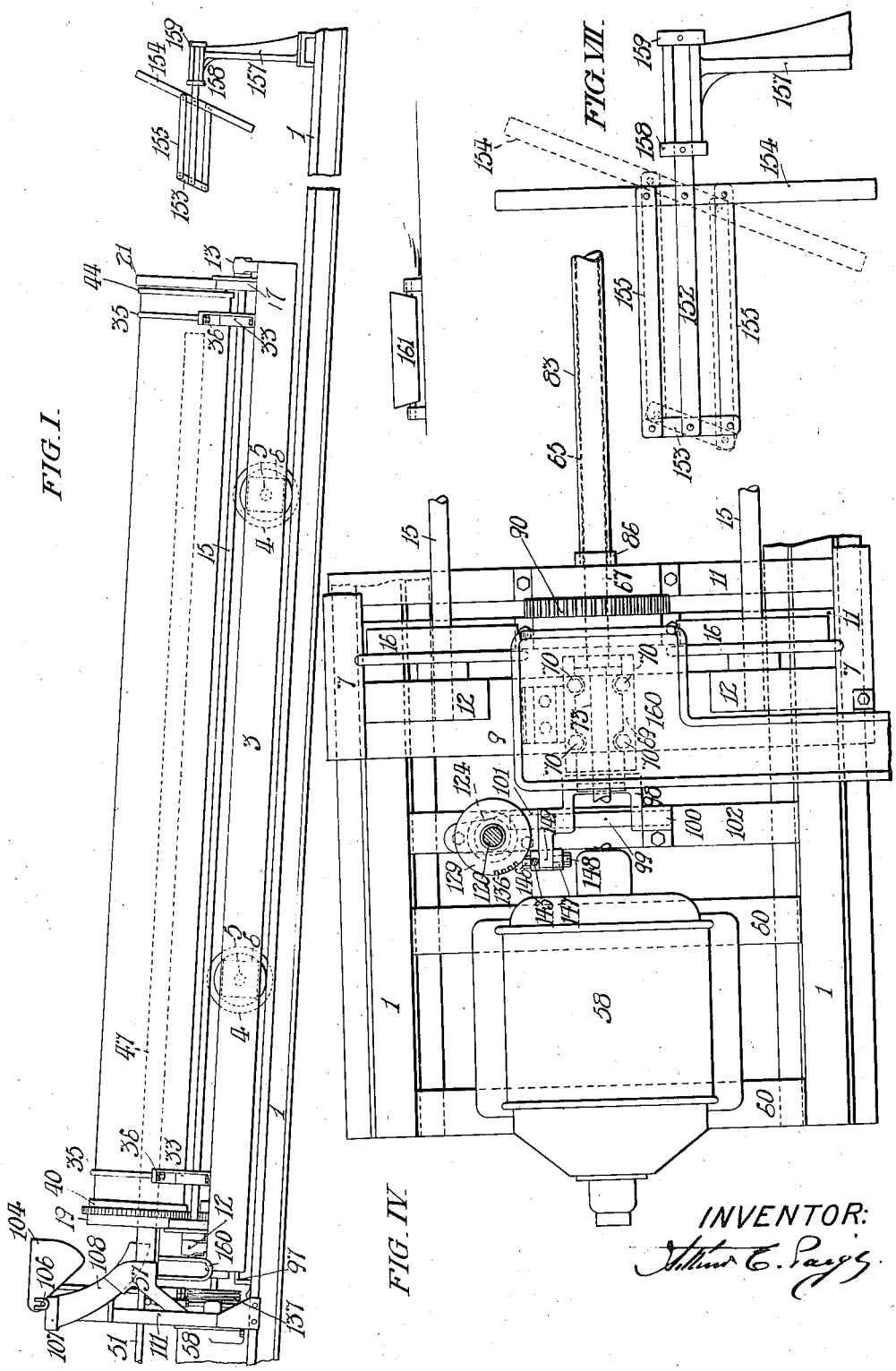

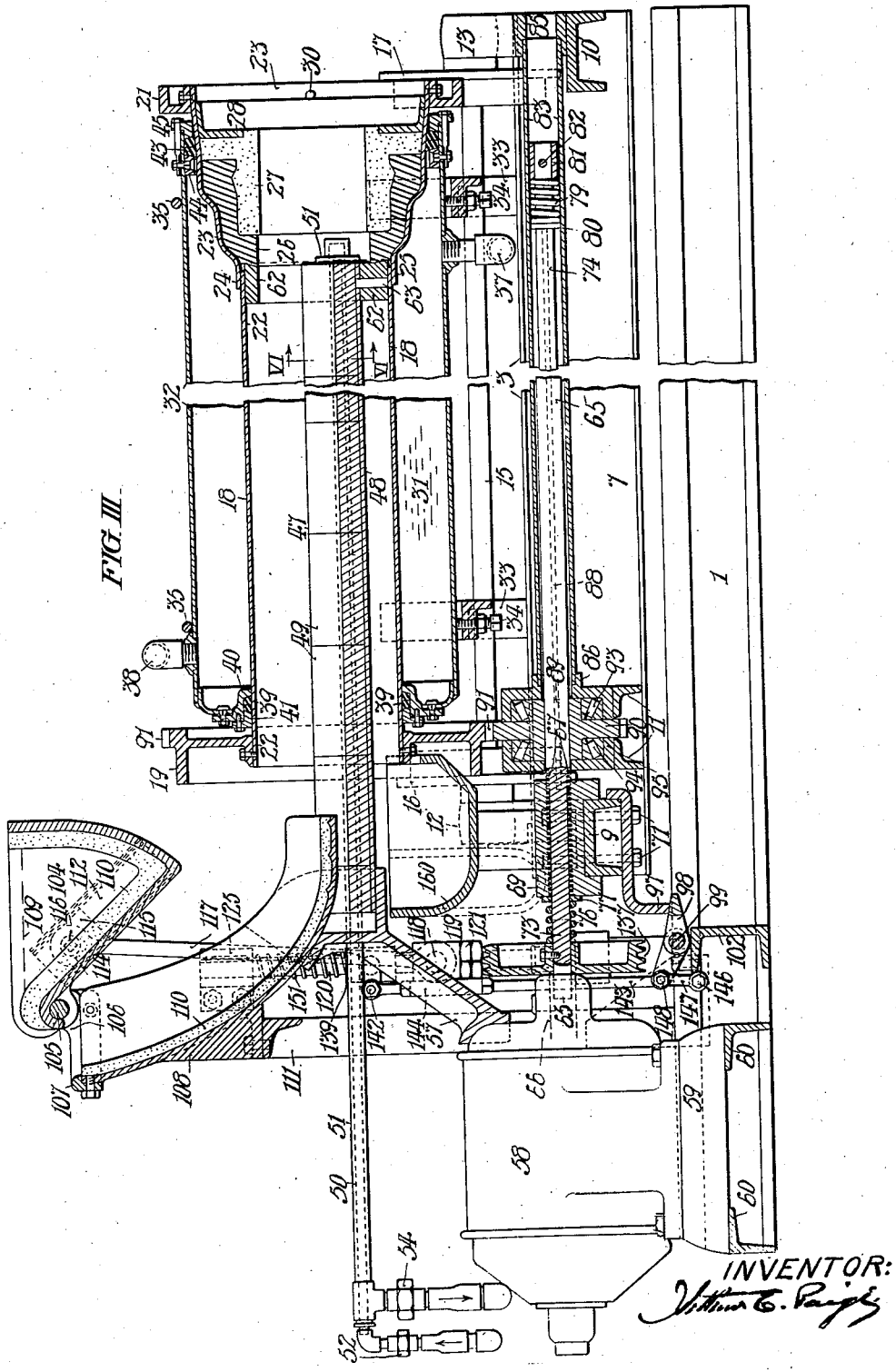

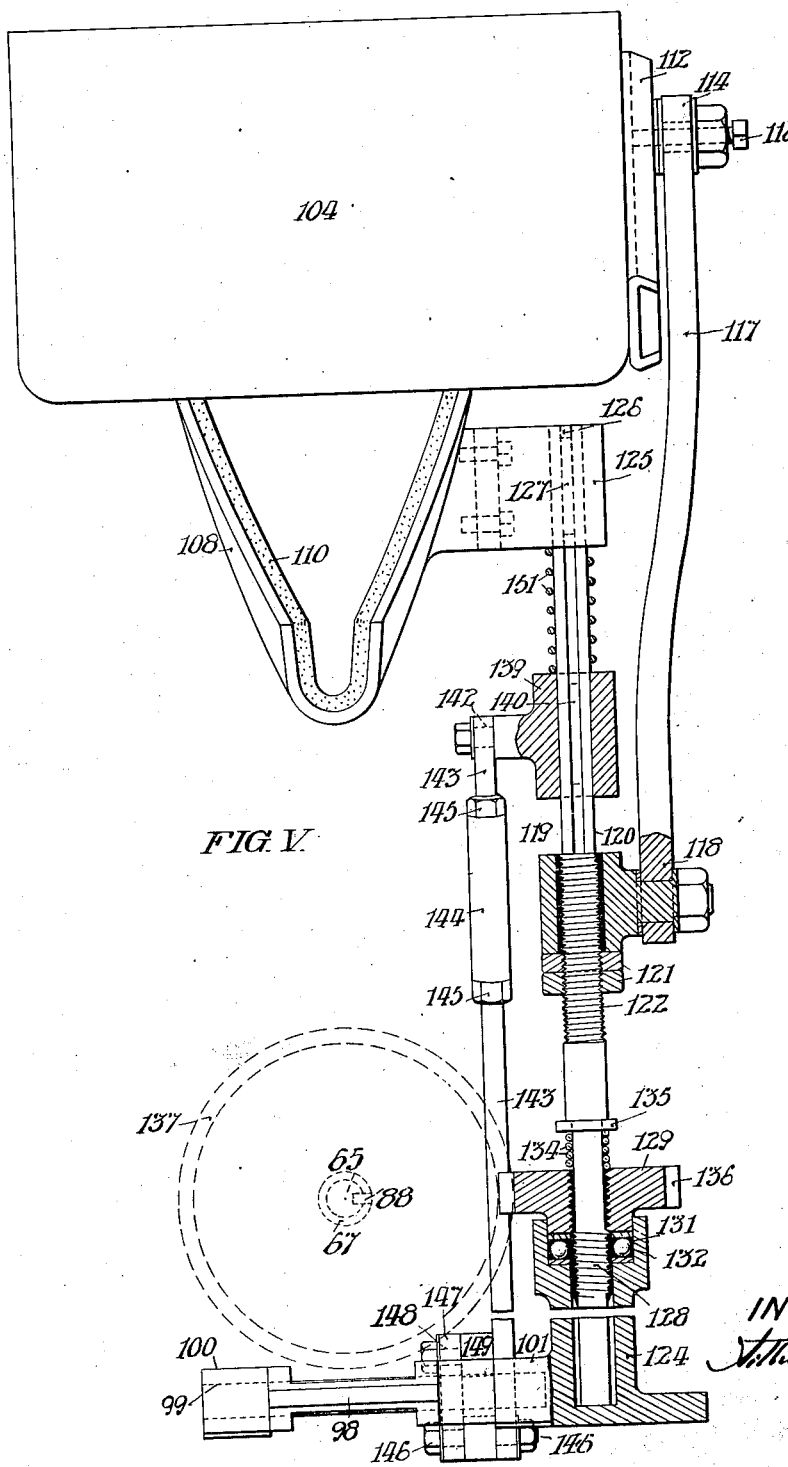

Patented Sept. 21, 1926.

1,600,904

UNITED STATES PATENT OFFICE.

ARTHUR E. PAIGE, OF PHILADELPHIA, PENNSYLVANIA.

CENTRIFUGAL CASTING MECHANISM.

Application filed October 17, 1925. Serial No. 62,947.

My invention may be employed with particular advantage in the manufacture of iron pipe in a rotary mold maintained with its axis inclined to the horizon, the metal being poured therein beginning at the lower end of the mold and continuing toward the upper end of the mold, from a stationary trough extending in the mold; the latter being relatively axially movable to distribute the metal therein.

In such mechanism there are at least five variable factors which determine the thickness of the pipe, viz, first, the angle of inclination of the mold; second, the temperature of the iron at the moment it is cast; third, the rate of flow of the metal from the delivery end of the trough into the mold; fourth, the rate of rotation of the mold; and fifth, the rate of axial traverse of the mold relative to the trough. Of course, the first factor aforesaid, may be fixed and the second factor may be controlled within a sufficiently limited range, and, in accordance with my invention all of said factors may be coordinated.

This invention relates to mechanism of the generic character claimed in Letters Patent of the United States, No. 1,538,585 granted to me May 19, 1925, in that the rate of flow of the metal into the mold; the rate of rotation of the mold; and the relative axial movement of the mold and trough are coordinated so that the mechanism is substantially automatically operative to produce pipe of uniform thickness.

Said Letters Patent disclose mechanism wherein the mold is prevented from moving axially during its rotation and the metal is distributed therein by relative movement of the trough, and the latter is provided at its discharge end with an abutment which serves to push the pipe out of the mold during the return movement of the trough to its initial position.

In that form of my invention a space more than three times the length of the pipe is required for the casting operation; the mold being axially stationary but the trough being reciprocated in and out of the mold at one end thereof; and the cast pipe being thrust out of the opposite end of the mold.

The form of my invention herein described, differs from that patented structure not only in that the mold is axially movable while the trough is held stationary but also in that the trough has no function or effect in the discharge of the pipe from the mold, and space only slightly more than twice the length of the pipe is required for the casting operation.

As hereinafter described, the axially movable mold carries the cast pipe, bell end forward, into engagement with a device which at the conclusion of the casting operation, grapples the end of the pipe initially cast, so that as the axial movement of the mold is reversed, to return it to its initial casting position; the cast pipe is withdrawn therefrom automatically. Such construction and arrangement are advantageous in saving both space and time.

My invention includes the various novel features of construction and arrangement hereinafter more definitely specified.

In said drawings; Fig. I is an elevation of the right hand side of a centrifugal casting mechanism embodying my invention. Fig. II is a front end elevation of said mechanism, as seen from the left of Fig. I, but on a larger scale than the latter. Fig. III is a fragmentary longitudinal vertical sectional view of said mechanism, taken on the line III, III in Fig. II. Fig. IV is a fragmentary plan view of a portion of the front end of said mechanism; the ladle, pouring trough and mold being omitted to show the details of construction and arrangement of the adjustable tripping mechanism. Fig. V is a fragmentary, partly sectional, rear view of the ladle tilting mechanism and tripping mechanism for controlling the axial movement of the mold. Fig. VI is a cross sectional view of the pouring trough, taken on the line VI, VI in Fig. III. Fig. VII is a side elevation of the pipe grappling device shown in Fig. I, but in grappling position.

In said figures; a track 1 is formed of a pair of parallel rails, preferably inclined, and at an angle of four degrees, to a horizontal plane. The truck frame 3 is provided with four supporting wheels 4, arranged to traverse said track; said wheels being separately journaled on respective fixed axles 5 having bases 6 bolted to said truck frame. Said truck frame is conveniently formed of wrought steel, including two opposite longitudinally extending channels 7, connected by two cross channels 9 and 10, respectively at the front and rear ends thereof, and cross bars 11 adjoining said channel 9. Said cross channels 9 and 10 each support two roller bearing brackets which are alike, but the brackets on said frame member 9 are marked 12 and those on said frame member 10 are indicated at 13. Said brackets 12 and 13 support two shafts 15 which are conveniently held stationary on said truck frame and support four mold bearing rollers, which are all alike, but the two at the front end of the machine are marked 16 and the two at the rear end of the machine are marked 17. Said frame 3 and rollers 16 and 17 support the rotary mold 18, which has the annular bearing flange 19 at its front end engaging said rollers 16 and has the annular bearing flange 21 at its rear end engaging said rollers 17.

Said mold is conveniently formed of a cut length of cylindrical commercial boiler tube 22 to which the pressed sheet metal bell end member 23 is rigidly connected, conveniently by the annular welded joints 24 and spot welds 25. However, a suitable mold may be otherwise formed.

In order to form the cast pipe 26 with an interior diameter at its bell end larger than the cylindrical portion of said pipe; I provide said mold with a tubular core 27 conveniently formed of a cementitious material carried by the circular plate 28 which is conveniently formed of sheet metal and removably fitted in said bell end member 23 of the mold in which it is detachably secured by a pair of diametrically opposite tapered pins 30, which are removed at the end of each casting operation.

In order to prevent distortion of said mold; I provide means to subject it to the action of a refrigerating fluid 31, preferably water, and conveniently by surrounding said mold with the tank 32 which is held stationary on said truck frame 3, in coaxial relation with said mold, by two frame brackets 33 each having three set screws 34 and a strap bolt 35 with nuts 36. Said tank has the cold water inlet 37 at the bottom thereof and the hot water outlet 38 at the top thereof respectively connected with a cold water supply under pressure and with a drain. In order to permit rotation of said mold in said tank without leakage of the water; I provide the front end of the tank with rings of packing 39 in a stuffing box 40 provided with the adjustable gland 41, and provide the rear end of said tank with the packing rings 43 in the stuffing box 44 provided with the adjustable gland 45.

It is to be understood that the circulation of water through said tank may be controlled by controlling the passage of water into the cold water inlet aforesaid, or by controlling the passage of water from the hot water outlet. In either case; the water flows upwardly through the tank, and the mold is continuously rotated therein during the casting operation so as to maintain the mold at the proper predetermined temperature.

The molten metal is directed into said mold by the pouring trough 47 which is conveniently formed of a half section of standard wrought iron pipe 48 lined with removable cast iron trough blocks 49. In order to prevent the molten metal from sticking to said trough; I prefer to cool it by water circulating through two pairs of pipes 50 and 51 which extend into the trough beneath said blocks in telescopic relation. Cold water is directed through the inner pipes 50 by way of the detachable union fitting 52 at the front end of the trough and returns in the space between said inner pipes 50 and the outer pipes 51 and is discharged through the detachable union fitting 54. Said fittings 52 and 54 are respectively connected to a water supply pipe and to a drain.

Said trough 47 has, at its front end, a strut 57 rigidly connecting it with the casing of the electric motor 58 which is fixed upon the base 59. Said base is rigidly connected with the cross bars 60, which extend between and are rigidly connected with said track rails 1; whereby said trough 47 is rigidly supported, extending in said mold 18, parallel with the axis of the latter. However, said trough carries the abutment ring 62 which is detachably rigidly connected therewith by three radial pins 63 which are driven into engagement with said trough through said ring 62; so that said ring may be removed when worn and replaced by another. Said ring 62, which is in sliding engagement with said mold 18, prevents said trough 47 from sagging at its inner end and serves as an abutment against which the front end of said pipe 26 is progressively cast, as indicated in Fig. III.

Longitudinal reciprocatory movement of said mold 18, with reference to said trough 47 is effected by the rotary screw shaft 65, which is detachably rigidly connected with the armature shaft 66 of said electric motor 58. Said screw shaft 65 is conveniently provided with two threads 67, of half inch pitch, which engage the nut 69, which for convenience of adjustment, removal and replacement is split and rigidly connected with said cross channel 9, of said truck frame 3, by the bolts 70 and nuts 71, best shown in Fig. II.

The length of the axial traverse of said mold 18 is, of course, determined by the length of said screw shaft 65 which is provided with said screw threads 67. However, the length of such traverse is the length of such threaded portion of such shaft 65 plus the length of said nut 69. That is to say; during the normal operation of the machine; said nut 69 reciprocates on said shaft and comes to rest at each end of its traverse when said nut runs off the threads 67 onto the unthreaded portions 73 and 74 thereof, at respectively opposite ends thereof. Said threads 67 being right hand; such traverse of said mold 18 is effected backward, to the right in Fig. III, when said shaft 65 is rotating counterclockwise as seen from the front of the machine, and forward movement of said mold is effected by reverse rotation of said shaft. To insure engagement of said thread 67 with said nut 69 to initiate such movement in either direction; I provide said shaft 65 with the spring 76 and thrust collar 77 at its end adjacent to said motor 58; said spring being so proportioned as to tend to push said nut 69 back onto the screw thread when it runs off the latter at that end. Similarly, I provide the end of said shaft 65 remote from said motor 58 with the spring 79 and thrust collar 80; said spring being held in the proper position by the abutment collar 81 which is detachably rigidly connected with said shaft 65, conveniently by the tapered pin 82, so that said spring tends to thrust said nut 69 back onto said threads 67 when it runs off said threads at that end of said shaft. Said shaft 65 is encased in the guide tube 83 which is rigidly supported in the brackets 85 and 86 respectively fixed on said truck frame cross bars 10 and 11.

Rotary movement of said mold 18 is effected by the same screw shaft 65; the latter having the longitudinal keyway 88 extending radially therein to a depth greater than the screw threads 67, to engage the spline key 89 which is fixed in the hub of the gear wheel 90 which is engaged with the circular series of gear teeth 91 which are conveniently formed in unitary connection with said annular bearing flange 19 at the front end of said mold. The rear hub of said gear wheel 90 is encountered by said thrust collar 80 at the end of each casting operation, to render said spring 79 effective as above described. In order to support said gear wheel independently of said shaft 65, but in concentric relation therewith, I mount it in roller bearings 93 and 94; the former being encased in said bracket 86 and the latter in the bracket 95; both of said brackets being rigidly connected with said cross bars 11 in the truck frame 3. Rotary movement of said mold 18 is conveniently effected contemporaneously with and independently of the axial movement thereof, as hereinafter described.

The construction and arrangement above described are such that when said motor 58 is operated to rotate said shaft 65 clockwise as seen from the front of the machine, said mold 18 is shifted toward said motor until the nut 69 runs off the screw thread 67 at the front end of said shaft 65; so that further rotation of said motor in the same direction merely effects continued rotation of the mold, in the same direction, without axial movement of the mold. However, upon reversal of the direction of rotation of said motor 58; said spring 76 causes said nut 69 and the truck and mold connected therewith to instantly begin to move away from said motor, if said spring be then free to act. Therefore, I arrange to variably determine the instant of beginning of such rearward movement of the mold, during which the metal for the casting is poured in the mold, by controlling the action of said spring 76. The mechanism for effecting such control includes the hook 97 which is engaged with said cross channel 9 of the truck frame and rigidly connected with said nut 69 by said bolts 70 and nuts 71 securing said nut. The detent lever 98 is arranged to automatically snap into engagement with the lower end of said hook 97 at the instant said nut 69 runs off said thread 67 at the front end of said screw shaft 65, i. e., at the instant said mold 18 reaches the front limit of its movement with respect to said trough 47.

Said detent lever 98 is fulcrumed upon the axis of the shaft 99 which is mounted to rock in the bearings 100 and 101 upon the stationary cross channel 102 which is rigidly connected with said track rails 1, as shown in Figs. III and IV. I provide means to automatically release said detent lever 98 and thus initiate the rearward movement of said mold 18 at a predetermined but adjustably variable instant in the pouring operation, by the means hereinafter described for tilting the pouring ladle 104; such means being of the generic character described and claimed in my Letters Patent 1,538,585 aforesaid.

Said pouring ladle 104 is mounted to rock upon the axis of the shaft 105 which is conveniently rigidly connected therewith, and journaled in the bearings 106 in the stationary frame member 107 which is detachably rigidly connected with the top of the stationary shoot 108 through which the molten metal 109 is directed into said trough 47. As indicated, said trough 47 and shoot 108 may be lined with removable cementitious material 110. Said shoot should be so curved as to afford the maximum gravitative acceleration to the molten metal, and is rigidly supported by said strut 57, and the arch frame 111 which is rigidly connected with said track rails 1 by suitable tie plates as shown in Figs. I, II, and III.

Said ladle has the undercut channel member 112 conveniently detachably rigidly connected therewith to engage, in variable radial position with respect to the axis of oscillation of the ladle, the link pivot 114 which has the base slide block 115 which is adapted to be adjusted longitudinally in said channel 112 and be rigidly connected therewith in adjusted position by the set screw 116. Said pivot 114 is engaged by the upper end of the link 117 which has its lower end engaged with the pivot 118 of the sleeve 119 which encircles the ladle lift screw shaft 120 and is vertically adjustable thereon by the lock nuts 121 engaging the screw thread 122, on that shaft.

Said ladle lift screw shaft 120 is provided with means, hereinafter described, adapted to reciprocate it automatically to a predetermined invariable extent, for instance, three inches; and the above described adjustable pivotal connections for said link 117 are provided to enable the operator to adjustably and variably determine the position of the ladle at which it begins to pour the molten metal 109 down said shoot 108, and the angular movement of said ladle consequent upon the vertical movement of said lift screw shaft 120. Such angular movement determines the volume of metal poured, and the arrangement is such that such pouring movement of the ladle may be coextensive with the backward, axial movement of the mold, (to the right in Fig. III), or more, or less; in accordance with such adjustment.

That is to say; said ladle 104 must be tilted to different extents in accordance with the volume of molten metal 109 which it is desired to deliver into the mold for a given casting, and it is desirable to have such delivery effected uniformly during the entire traverse of the mold 18, and the adjustable elements aforesaid permit variation in the amount of metal poured from the ladle per unit of traverse of the mold; despite the fact that the range of movement of the ladle lift screw 120 is invariable.

Said ladle lift shaft 120 is mounted to reciprocate in two stationary bearings; viz. the bottom step bearing 124, (formed in unitary relation with said bearing 101, as best shown in Fig. II), and the top bearing 125 which is rigidly connected with said shoot 108. Said shaft 120 is prevented from turning by engagement of its keyway 126 with the key 127 in said top bearing 125. Said shaft 120 is provided with the left hand, ladle lift screw 128 for engagement with the nut 129, by rotation of which it is raised and lowered. In its idle position, shown in Figs. II and V, said lift screw shaft 120 rests upon the bottom of said step bearing 124 which thus supports the weight of the ladle 104, and, in that position, said nut 129 encircles said shaft 120 above said screw thread 128; which position said nut has assumed by right hand rotation. However, said step bearing 124 has the socket 131 containing the ball thrust bearing 132 upon which said nut 129 rests when said shaft 120 is lifting said ladle, and said nut 129 comes down upon said bearing and into engagement with said screw thread 128 as the consequence of left hand rotation of said nut; the latter being then pressed downward by the spring 134 which encircles said shaft 120 and has its upper end against the abutment ring 135.

I find it convenient to impart such right and left hand rotation to said nut 129 by providing it with worm gear teeth 136 in engagement with the worm 137 which is rigidly connected with said screw shaft 65 as indicated in Fig. III, and has a right hand thread.

Of course, the rotary movement of said nut 129 and the axial movement of said ladle lift shaft 120 which it effects, are thus co-ordinated with both the rotary and axial movement of said mold 18, which are effected, as above described, by rotation of said screw shaft 65.

The means arranged to automatically release said detent lever 98 and thus initiate the outward movement of said mold 18, with reference to the stationary trough 47, at a predetermined but adjustably variable instant in the pouring operation of said ladle 104, include the sleeve 139, shown in Figs. II and III encircling said lift screw shaft 120, upon which it is prevented from turning by the key 140 engaging said keyway 126 in said shaft 120. Said sleeve 139 has the pivot stud 142 engaging the upper section of the connecting rod 143 which is rigidly adjustably connected with its lower section by the turn buckle 144 and jam nuts 145. The lower section of said connecting rod 143 is pivotally connected by the bolt 146 with the link 147, which latter is pivotally connected with the stud 148 on the arm 149 of said detent lever 98. Said link 147 may be omitted and said rod 143 directly connected to said arm 149, if the latter be long enough to permit the movement of said sleeve 139. Said sleeve 139 is continuously pressed downward by the spring 151, encircling said shaft 120, to snap said lever 98 into engagement with said hook 97. However, said sleeve 139 is lifted to release said detent lever 98 by the upward movement of said sleeve 139 as the latter is raised by said screw shaft 120, consequent upon the rotation of said nut 129, by the worm 137 carried by said screw shaft 65, and the instant of such release may be adjustably predetermined by the length to which said connecting rod 143 is adjusted. That is to say; said connecting rod may be adjusted to uphold said sleeve 139 above said sleeve 119 to any extent which it is desired to permit said ladle to be lifted in pouring operation before said sleeve 139 is lifted to initiate the rearward movement of said mold 18. Such adjustment is so effected that sufficient metal 109 is initially poured into the mold 18 to properly form the bell end of said pipe 26, in said bell member 23 of the mold, before said mold is withdrawn, with respect to said trough 47, to the right in Fig. III.

The mechanism above described may be operated as follows: Said mold 18 being at the front limit of its longitudinal movement with respect to said trough 47, and with said detent lever 98 snapped up into engagement with the lower end of said hook 97, then slightly farther to the left in Fig. III; said motor 58 is started to rotate its armature shaft 66 and said screw shaft 65 counterclockwise as seen from the front of the machine; thus rotating the mold 18, clockwise, and rotating said nut 129 counterclockwise. If said detent lever 98 were released, such movement would initiate the backward axial movement of said mold 18 simultaneously with the upward tilting movement of said ladle 104. However, as said lever 98 is in position to detain said spring 76 from effecting engagement of said nut 69 with the screw thread 67 on the shaft 65; the latter rotates idly in said nut but, of course, turns the worm 137 which operates the nut 129 to lift said screw shaft 120 and ladle 104 and initiate pouring operation of the latter. Such pouring operation of the ladle continues until the sleeve 119 on said shaft 120 picks up the sleeve 139 on said shaft far enough to trip and release said detent lever 98 from engagement with said hook 97. Thereupon, said spring 76 thrusts said nut 69 toward the right in Fig. III, to engage its threads with said threads 67 on said screw shaft 65, and continued rotation of the latter, in the same direction, i. e., counterclockwise, causes the mold 18 to be withdrawn to the right in Fig. III, thus distributing the poured metal throughout the cylindrical portion of said mold 18, until said nut 69 passes entirely off said threads 67 on the shaft 65, at the right hand end thereof in Fig. III, so that said shaft turns idly in said nut with the rear hub of said gear 90 pushing against said thrust collar 80 and spring 79 at the rear end of said screw shaft 65. In that position; the final left hand spigot end of said pipe 26 is cast against said abutment ring 62 on the trough 47. Any metal overflowing said abutment ring 62 passes down the spill trough 160 and is caught in the tiltable spill basin 161.

Of course, said ladle lift screw shaft 120 continues to lift said ladle 104 until said nut 129 runs off said screw 128 onto the unthreaded portion of said shaft 120 below said screw, at the end of the casting operation aforesaid. Thereupon, said mold 18 may continue to rotate in the same, clockwise, direction without axial movement of said mold 18 or tilting movement of said ladle 104. A suitable pipe grappling device, for instance including the rotatable axial support 152, carrying the levers 153 and 154, connected by the links 155, is engaged with said core 27, by the aforesaid rearward axial movement of the mold, bringing the mold member 23 against said lever 154; while said support 152 is journaled in the stationary bearing 157, between its collars 158 and 159, to temporarily hold said pipe 26 while the mold is being withdrawn therefrom, frontward; by reversal of said motor 58.

When thus reversed; said motor 58 drives said screw shaft 65 and gear 90 clockwise; and said mold 18 counterclockwise; whereupon said spring 79 thrusts said nut 69 into engagement with the screw thread 67 on said shaft 65 and initiates the frontward movement of said mold 18 with respect to said trough 47 and, contemporaneously, reverses the rotation of said nut 129 on the ladle lift screw shaft 120; so that said nut turns to the right, and engages said screw 128 which is thrust downwardly therethrough by the weight of the ladle 104, and thus lowers said ladle to its original position shown in the drawings.

During such downward movement of said ladle 104, or at the end of said movement; said ladle may be recharged with molten metal 109 and preferably with a weighed quantity thereof. Of course, in such frontward movement of the mold 18 with respect to the trough 47, said abutment ring 62 bears against the left hand end of the finished cast pipe 26, preventing movement of the latter to the left in Fig. III. Such forward movement of the mold is preceded by removal of said core plate pins 30 so that the core 27 and its plate 28, are ejected from the bell member 23 of the mold, by such movement, followed by the discharge of the pipe 26, as the mold travels to the left in said figure, to assume its initial pouring position. Said pipe 26 is rolled aside by manipulation of said lever 154. Said support 152 being thus released from the bearing 157, is released from said pipe 26 by returning said lever 154 to its normal inclined position; the grapple replaced as in Fig. I, and the plate 28 and core 27 knocked loose from the pipe. Thereupon, the operation may be repeated as above described.

In the form of my invention above described, I have found it convenient to employ an ordinary electric motor 58 to turn said shaft 65 1150 revolutions per minute; whereby the rearward axial movement of said mold 18 is effected in less than twenty seconds, but, as above described, the detent lever 98 detains the mold from that movement until after the pouring operation of the ladle has begun. Therefore, the complete casting operation of a standard twelve foot length pipe continues approximately one-half minute. However, all of said movements are so coordinated as above described as to effect the cooperation of the various parts of the mechanism automatically. An advantage of such coordination is the elimination of the variations in time of operation of the various parts which are manifested in variations in the product. In other words; such coordination permits uniformity in the pipes produced by reason of uniformity in the operations of producing them. Moreover, in the use of casting machines of the prior art which are not thus automatically operative; any one of the operators may retard the operation of the mechanism and thus lessen the production of castings, by failing to cooperate with the other operators in the proper rhythm. Therefore, a very important advantage of my invention is that the rhythm of operation may be automatically controlled by the mechanism, at the maximum speed of production of which the mechanism is capable.

However, as above explained; there are numerous variable factors which affect the operation of centrifugal casting mechanism and the various movements above described must be coordinated in accordance therewith. For instance, in the arrangement chosen for illustration; the axis of the mold is inclined four degrees to a horizontal plane, and the cast iron is poured at approximately 2200° F.; but it is obvious that the angle of inclination of the mold may be different and the metal poured at a different temperature, provided that the other factors are coordinated therewith.

Although I have illustrated my invention with reference to mechanism including a mold adapted for casting bell end pipe; it is to be understood that I do not desire to limit myself thereto; as other forms of molds may be employed in interchangeable relation with the other parts of the apparatus above described.

Therefore, I do not desire to limit myself to the precise details of construction, arrangement or procedure herein set forth, as it is obvious that various modifications may be made therein without departing from the essential features of my invention, as defined in the appended claims.

I claim:

1. In centrifugal casting mechanism, the combination with a stationary pouring trough; of a rotary axially movable mold; a tiltable ladle arranged to supply molten metal to said trough; and means cooperatively connecting said mold and ladle, arranged to first effect rotation of said mold for a predetermined interval; then effect contemporaneous rotary movement of said mold, axial movement of said mold, and tilting movement of said ladle, in definite predetermined relation to each other.

2. In centrifugal casting mechanism, the combination with a rotary axially movable mold; of a stationary pouring trough arranged to deliver molten metal into said mold; a tiltable ladle arranged to supply molten metal to said trough; and means cooperatively connecting said mold and ladle; arranged to effect rotary and longitudinal movement of said mold with respect to said trough, and tilting movements of said ladle with respect to said trough, in definite predetermined relation to each other.

3. In centrifugal casting mechanism, the combination with a rotary axially movable mold; of a stationary pouring trough arranged to deliver molten metal into said mold; a tiltable ladle arranged to supply molten metal to said trough; and means arranged to effect rotary movements of said mold, longitudinal movements of said mold with respect to said trough, and tilting movements of said ladle with respect to said trough, in definite predetermined relation to each other.

4. In centrifugal casting mechanism, the combination with a rotary axially movable mold; of a stationary pouring trough; and means cooperatively connecting said mold and trough, including a rotary screw shaft, a nut mounted in engagement with said screw; means connecting said nut with said mold and preventing rotary movement of said nut; and gears connecting said mold and screw; whereby rotary and longitudinal movements of said mold with respect to said trough are automatically effected in definite predetermined relation.

5. In centrifugal casting mechanism, the combination with a rotary axially movable mold; of a tiltable ladle arranged to supply molten metal to said mold; and means cooperatively connecting said mold and ladle, including a screw having means arranged to rotate it, a nut mounted for axial movement on said screw, without rotation, and gears connecting said mold and screw; whereby rotary and axial movements of said mold and tilting movements of said ladle are automatically effected in definite predetermined relation.

6. In centrifugal casting mechanism, the combination with a rotary axially movable mold; of a stationary pouring trough; a tiltable ladle arranged to supply molten metal to said trough; and means cooperatively connecting said mold and ladle; arranged to coordinately effect movements thereof in definite predetermined relation to each other and to said trough.

7. In centrifugal casting mechanism, the combination with a rotary axially movable mold; of a stationary pouring trough; a tiltable ladle arranged to supply molten metal to said trough; and means cooperatively connecting said mold and ladle; arranged to effect movements thereof in definite predetermined relation to each other, including a detent device operative to prevent axial movement of said mold, and tripping means connecting said detent device with said ladle, arranged to release said detent and effect axial movement of said mold after a predetermined movement of said ladle.

8. In centrifugal casting mechanism, the combination with a rotary axially movable mold; of a container arranged to direct molten metal into said mold; means arranged to rotate said mold and shift it axially alternately in opposite directions; and means cooperatively connecting said mold and container; arranged to effect movement of said mold and container in definite predetermined relation to each other, including means permitting continued rotation of said mold after predetermined movement of said container contemporaneous with movement of said mold.

9. In centrifugal casting mechanism, the combination with a rotary axially movable mold; of a stationary trough arranged to direct molten metal into said mold; means arranged to rotate and axially shift said mold alternately in opposite directions; and means arranged to effect movement of said mold, in definite predetermined relation to said trough, including means permitting continued rotation of said mold, without axial movement thereof, after predetermined axial movement of said mold contemporaneous with rotary movement thereof.

10. In centrifugal casting apparatus, the combination with a rotary axially movable mold; of means arranged to direct molten metal into said mold; and means arranged to effect movements of said mold and directing means in definite predetermined relation to each other, including a rotary screw, and a nut engaging said screw and prevented from rotating.

11. In centrifugal casting mechanism, the combination with a rotary axially movable mold; of a container arranged to direct molten metal into said mold; means cooperatively connecting said mold and container, arranged to effect movements of said mold and container in definite predetermined relation to each other, including a rotary screw shaft having a screw thread intermediate of its length and unthreaded portions at each end of said screw thread, and a nut mounted for axial movement on said shaft, without rotation, and springs at respectively opposite ends of said shaft adapted to draw said nut into engagement with said shaft; whereby rotation of said shaft in one direction causes said nut to move axially thereon to the extent of said screw thread on said shaft and in said nut, and to automatically stop such axial movement with said nut in registry with an unthreaded portion of said shaft and, upon reverse rotation of said shaft, cause said nut to move axially thereon, in the opposite direction, to the extent of the screw thread on said shaft and in said nut and automatically stop such axial movement with said nut in registry with an unthreaded portion of said shaft.

12. In centrifugal casting apparatus, the combination with a rotary axially movable mold; of a container arranged to direct molten metal into said mold; and means cooperatively connecting said mold and container; arranged to effect movement of said mold and container in definite predetermined relation to each other, including an axially immovable rotary screw and a nut mounted to move axially on said screw without rotation; and spring means arranged to automatically engage said nut with said screw at opposite ends of said screw as a consequence of rotary movements of said screw in respectively opposite directions.

13. In centrifugal casting mechanism, the combination with an inclined track formed of parallel rails; of a truck including a frame provided with supporting wheels arranged to traverse said track; means arranged to support a rotary mold on said truck frame, including pairs of rollers at respectively opposite ends of said mold; a stationary pouring trough arranged to extend in said mold; and means arranged to axially shift said mold with respect to said pouring trough and to rotate said mold, including a nut held in stationary position on said truck, a rotary screw shaft extending parallel with said track in engagement with said nut; a gear in coaxial relation with said screw shaft and arranged to be rotated thereby, but carried axially on said shaft with said truck; a gear on said mold engaging said shaft gear; and means arranged to rotate said shaft, including an electric motor mounted in stationary relation with said track; a tiltable ladle arranged to supply molten metal to said mold through said trough; and means cooperatively connecting said mold and ladle, including a worm turned by said screw shaft, whereby, said ladle is tilted to pour metal into said mold in accordance with the axial movement of said mold.

14. In centrifugal casting mechanism, the combination with an inclined track formed of parallel rails; of a truck including a frame provided with supporting wheels arranged to traverse said track; means arranged to support a rotary mold on said truck frame; a stationary pouring trough arranged to extend in said mold; and means arranged to axially shift said mold with respect to said pouring trough and to rotate said mold, including a nut held in stationary position on said truck, a rotary screw shaft extending parallel with said track in engagement with said nut, a gear arranged to be rotated by said screw shaft, but carried axially on said shaft with said truck, a gear on said mold engaging said shaft gear, and means arranged to rotate said shaft; a tiltable ladle arranged to supply molten metal to said mold through said trough; and means cooperatively connecting said mold and ladle, including a worm turned by said screw shaft; whereby, said ladle is tilted to pour metal into said mold in accordance with the axial movement of said mold.

15. In centrifugal casting mechanism, the combination with an inclined track formed of parallel rails; of a truck including a frame provided with supporting wheels arranged to traverse said track; means arranged to support a rotary mold on said truck frame; a stationary pouring trough arranged to extend in said mold; and means arranged to axially shift said mold with respect to said pouring trough and to rotate said mold, including a nut held in stationary position on said truck, a rotary screw shaft extending parallel with said track in engagement with said nut, a gear arranged to be rotated by said screw shaft, but carried axially on said shaft with said truck, a gear on said mold engaging said shaft gear, and means arranged to rotate said shaft; a tiltable ladle arranged to supply molten metal to said mold through said trough; and means cooperatively connecting said mold and ladle; whereby, said ladle is tilted to pour metal into said mold in accordance with the axial movement of said mold.

16. In centrifugal casting mechanism, the combination with an inclined track formed of parallel rails; of a truck including a frame provided with supporting wheels arranged to traverse said track; means arranged to support a rotary mold on said truck frame, including pairs of rollers at respectively opposite ends of said mold; a stationary pouring trough arranged to extend in said mold; and means arranged to axially shift said mold with respect to said pouring trough and to rotate said mold, including a nut held in stationary position on said truck, a rotary screw shaft extending parallel with said track in engagement with said nut; a gear in coaxial relation with said screw shaft and arranged to be rotated thereby, but carried axially on said shaft with said truck; a gear on said mold engaging said shaft gear; and means arranged to rotate said shaft, including a motor mounted in stationary relation with said track.

17. In centrifugal casting mechanism, the combination with an inclined track formed of parallel rails; of a truck including a frame provided with supporting wheels arranged to traverse said track; means arranged to support a rotary mold on said truck frame; a stationary pouring trough arranged to extend in said mold; and means arranged to axially shift said mold with respect to said pouring trough and to rotate said mold, including a nut held in stationary position on said truck, a rotary screw shaft extending parallel with said track in engagement with said nut; a gear in coaxial relation with said screw shaft and arranged to be rotated thereby, but carried axially on said shaft with said truck; a gear on said mold engaging said shaft gear; and means arranged to rotate said shaft.

18. In centrifugal casting mechanism, the combination with an inclined track formed of parallel rails; of a truck including a frame provided with supporting wheels arranged to traverse said track; means arranged to support a rotary mold on said truck frame; a pouring trough arranged to extend in said mold; and means arranged to axially shift said mold with respect to said pouring trough and to rotate said mold, including a nut held in stationary position on said truck, a rotary screw shaft extending parallel with said track in engagement with said nut, and a gear arranged to be rotated by said screw shaft, but carried with said truck; and means arranged to rotate said shaft.

19. In centrifugal casting mechanism, the combination with a track; of a truck provided with supporting wheels arranged to traverse said track; and means arranged to support a rotary mold on said truck frame, including two pairs of rollers respectively journaled at opposite ends of said truck frame; a rotary mold having roller flanges at opposite ends thereof respectively engaged with said pairs of supporting rollers; a tank carried by said truck surrounding said mold; means supporting said tank in coaxial relation with said mold, including two frame brackets on said truck each having a series of radially adjustable set screws therein, and a strap bolt provided with nuts engaging said bracket; a pouring trough extending in said mold; and means arranged to axially shift said mold with respect to said pouring trough, by movement of said truck, including a nut carried by said truck, and a rotary screw shaft extending parallel with the axis of said mold in engagement with said nut; and means arranged to rotate said screw shaft.

20. In centrifugal casting mechanism, the combination with a track; of a truck provided with supporting wheels arranged to traverse said track; and means arranged to support a rotary mold on said truck frame, including two pairs of rollers respectively journaled at opposite ends of said truck frame; a rotary mold having roller flanges at opposite ends thereof respectively engaged with said pairs of supporting rollers;

a tank carried by said truck surrounding said mold; means supporting said tank in coaxial relation with said mold, including two frame brackets on said truck each having a series of radially adjustable set screws therein, and a strap bolt provided with nuts engaging said bracket; a pouring trough extending in said mold; and means arranged to axially shift said mold with respect to said pouring trough.

21. In centrifugal casting mechanism, the combination with a track; of a truck provided with supporting wheels arranged to traverse said track; a rotary mold journaled on said truck frame; a tank carried by said truck surrounding said mold; means supporting said tank in coaxial relation with said mold, including two series of radially adjustable set screws and a strap bolt encircling said tank in opposition to said screw; a pouring trough extending in said mold; and means arranged to axially shift said mold and truck with respect to said pouring trough.

22. In centrifugal casting mechanism, the combination with a truck provided with supporting wheels; of a rotary mold journaled on said truck; means forming a water jacket for said mold; a pouring trough extending in said mold; and means arranged to axially shift said mold with respect to said pouring trough, by movement of said truck, including a nut carried by said truck, and a rotary screw shaft extending parallel with the axis of said mold in engagement with said nut; and means arranged to rotate said screw shaft.

23. In centrifugal casting mechanism, the combination with a rotary, axially movable mold; of means arranged to rotate and axially move said mold, including a gear on said mold; a driving gear engaging said mold gear; and a rotary shaft in coaxial relation with, and arranged to rotate said driving gear; a screw thread on said shaft and a nut engaging said screw thread; and means preventing rotation of said nut and connecting it for axial movement with said mold.

In testimony whereof, I have hereunto signed my name at Philadelphia, Pennsylvania, this sixteenth day of October, 1925.

ARTHUR E. PAIGE.